US009042369B2

(12) United States Patent
Jain et al.

(10) Patent No.: US 9,042,369 B2
(45) Date of Patent: May 26, 2015

(54) SYSTEM AND METHOD FOR REFLECTING FEC ROUTE INFORMATION

(71) Applicants: Pradeep G Jain, Mountain View, CA (US); Kanwar D Singh, Mountain View, CA (US)

(72) Inventors: Pradeep G Jain, Mountain View, CA (US); Kanwar D Singh, Mountain View, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 44 days.

(21) Appl. No.: 13/799,009

(22) Filed: Mar. 13, 2013

(65) Prior Publication Data

US 2014/0269747 A1 Sep. 18, 2014

(51) Int. Cl.
*H04L 12/28* (2006.01)
*H04L 12/723* (2013.01)

(52) U.S. Cl.
CPC .................................. *H04L 45/507* (2013.01)

(58) Field of Classification Search
CPC ......... H04L 45/50; H04L 45/10; H04L 45/00; H04L 41/084; H04L 67/14; H04L 67/146; H04L 45/507; H04L 45/04
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/523–520, 521–529
See application file for complete search history.

(56) References Cited

U.S. PATENT DOCUMENTS

| | | | | |
|---|---|---|---|---|
| 6,967,927 | B1* | 11/2005 | Dugeon et al. | 370/236.1 |
| 7,787,380 | B1* | 8/2010 | Aggarwal et al. | 370/236 |
| 8,179,905 | B1* | 5/2012 | Napierala et al. | 370/401 |
| 8,422,514 | B1* | 4/2013 | Kothari et al. | 370/466 |
| 8,611,359 | B1* | 12/2013 | Kompella et al. | 370/401 |
| 2004/0156313 | A1* | 8/2004 | Hofmeister et al. | 370/229 |
| 2006/0029032 | A1* | 2/2006 | Allan et al. | 370/351 |
| 2006/0062218 | A1* | 3/2006 | Sasagawa | 370/389 |
| 2006/0171323 | A1* | 8/2006 | Qian et al. | 370/252 |
| 2008/0225864 | A1* | 9/2008 | Aissaoui et al. | 370/401 |
| 2008/0253381 | A1* | 10/2008 | Ward et al. | 370/396 |
| 2010/0124180 | A1* | 5/2010 | Benkis | 370/252 |
| 2010/0302973 | A1* | 12/2010 | Lange et al. | 370/254 |
| 2011/0040885 | A1* | 2/2011 | Jounay et al. | 709/228 |
| 2011/0261824 | A1* | 10/2011 | Jounay et al. | 370/395.53 |
| 2012/0099598 | A1* | 4/2012 | Cao et al. | 370/392 |
| 2012/0099861 | A1* | 4/2012 | Zheng | 398/45 |
| 2012/0236730 | A1* | 9/2012 | Zhou et al. | 370/244 |
| 2013/0094474 | A1* | 4/2013 | Le Clech et al. | 370/331 |
| 2013/0107725 | A1* | 5/2013 | Jeng et al. | 370/248 |
| 2013/0121169 | A1* | 5/2013 | Zhao et al. | 370/242 |
| 2013/0208582 | A1* | 8/2013 | Wijnands et al. | 370/218 |
| 2013/0266006 | A1* | 10/2013 | Dutta et al. | 370/389 |

OTHER PUBLICATIONS

The International Search Report and the Written Opinion of the International Searching Authority, or the Declaration in PCT/US2014/020385, mailed Aug. 1, 2014, Alcatel Lucent, Applicant, 17 pages.

(Continued)

*Primary Examiner* — Jung-Jen Liu
(74) *Attorney, Agent, or Firm* — Wall & Tong, LLP

(57) ABSTRACT

Systems, methods, architectures and/or apparatus for reflecting information between provider equipment (PE) nodes associated with a Virtual Private LAN Service (VPLS) via a network element adapted to operate as a Forwarding Equivalence Class (FEC) Reflector (FR) node.

20 Claims, 4 Drawing Sheets

(56) References Cited

OTHER PUBLICATIONS

Kompella K et al: "Virtual Private LAN Service (VPLS) Using BGP for Auto-Discovery and Signaling; rfc4761.txt", Jan. 1, 2007, XP015055050; ISSN: 0000-0003; p. 3, paragraph 1. Introduction—p. 4, paragraph 1.1. Scope of This Document; figure 1; p. 6, paragraph 3. Control Plane—p. 8, paragraph 3.2. Signaling; p. 17, paragraph 3.6. Hierarchical BGP VPLS.

Lasserre M et al: "Virtual Private LAN Service (VPLS) Using Label Distribution Protocol (LDP) Signaling; rfc4762.5xt", Jan. 1, 2007, XP015055051; ISSN: 000-0003; p. 1, paragraph Abstract; p. 7, paragraph 6. Control Plane—p. 9, paragraph 6.2.1. Using the Generalized PWid FEC Element.

Bates Cisco Systems R Chandra E Chen Redback Networks T: "BGP Route Reflection—An Alternative to Full Mesh IBGP; rfc2796.txt", Apr. 1, 2000, XP015008579; ISSN: 0000-0003; the whole document.

Martini L et al: "Pseudowire Setup and Maintenance Using the Label Distribution Protocol (LDP); rfc4447.txt", Apr. 1 2006; XP015046298; ISSN: 0000-003; p. 7, paragraph 5. LDP—p. 16, paragraph 5.3.3. Signaling Procedures.

* cited by examiner

US 9,042,369 B2

SYSTEM AND METHOD FOR REFLECTING FEC ROUTE INFORMATION

FIELD OF THE INVENTION

The invention relates generally to communication networks and, more specifically but not exclusively, to improving LDP scaling in full mesh Pseudo-Wire applications.

BACKGROUND

Label Distribution Protocol (LDP) enables peer label switch routers (LSRs) in a Multi-Protocol Label Switching (MPLS) network to exchange label binding information for supporting hop-by-hop forwarding. Various Layer 2 services (such as Frame Relay, Asynchronous Transfer Mode, Ethernet and the like) may be emulated over an MPLS backbone by encapsulating the Layer 2 Protocol Data Units (PDU) and transmitting them over a pseudowire (PW).

Typical VPLS (Virtual Private LAN Service) scenarios call for a full mesh of Pseudo-Wires between participating provider edge (PE) nodes, which is achieved using a full mesh of targeted LDP (T-LDP) session connectivity. This requires each PE node to maintain a large number of T-LDP sessions, which is challenging in High Availability scenarios since the cost of maintaining TCP sessions is very high.

SUMMARY

Various deficiencies in the prior art are addressed by systems, methods, architectures and/or apparatus for reflecting information between provider equipment (PE) nodes associated with a Virtual Private LAN Service (VPLS) via a network element adapted to operate as a Forwarding Equivalence Class (FEC) Reflector (FR) node.

A method according to one embodiment comprises designating a node to operate as a Forwarding Equivalence Class (FEC) Reflector (FR) node; selecting a VPLS instance for concentration at the FR node; and establishing a T-LDP session between the FR node and one or more PE nodes associated with the selected VPLS instance; wherein the PE nodes are adapted to exchange common VPLS information via the FR node.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be discussed within the context of systems, methods, architectures and/or apparatus implementing a Forwarding Equivalence Class (FEC) Reflector (or FR) functionality within the context of a relatively large network in which a large number of participating Label Switching Routers (LSRs) such as provider edge (PE) devices are used to implement VPLS (Virtual Private LAN Service) in a manner avoiding the use of full mesh of targeted Label Distribution Protocol (T-LDP) session connectivity. However, it will be appreciated by those skilled in the art that the invention has broader applicability than described herein with respect to the various embodiments.

Generally speaking, the invention provides that every LSR/PE establishes a single T-LDP session to a pre-configured node or network element denoted herein as a Forwarding Equivalence Class (FEC) Reflector (FR) to thereby avoid the need to configure full mesh of T-LDP sessions between all PEs. For example, each LSR/PE uses a Label Mapping Message including a FEC TLV and a Label TLV to advertise to its LDP peers a binding of a FEC to a label. In this manner, specific labels are assigned by a LSR to various pseudo-wires terminating appropriate FEC data at the LSR.

Figure 1:
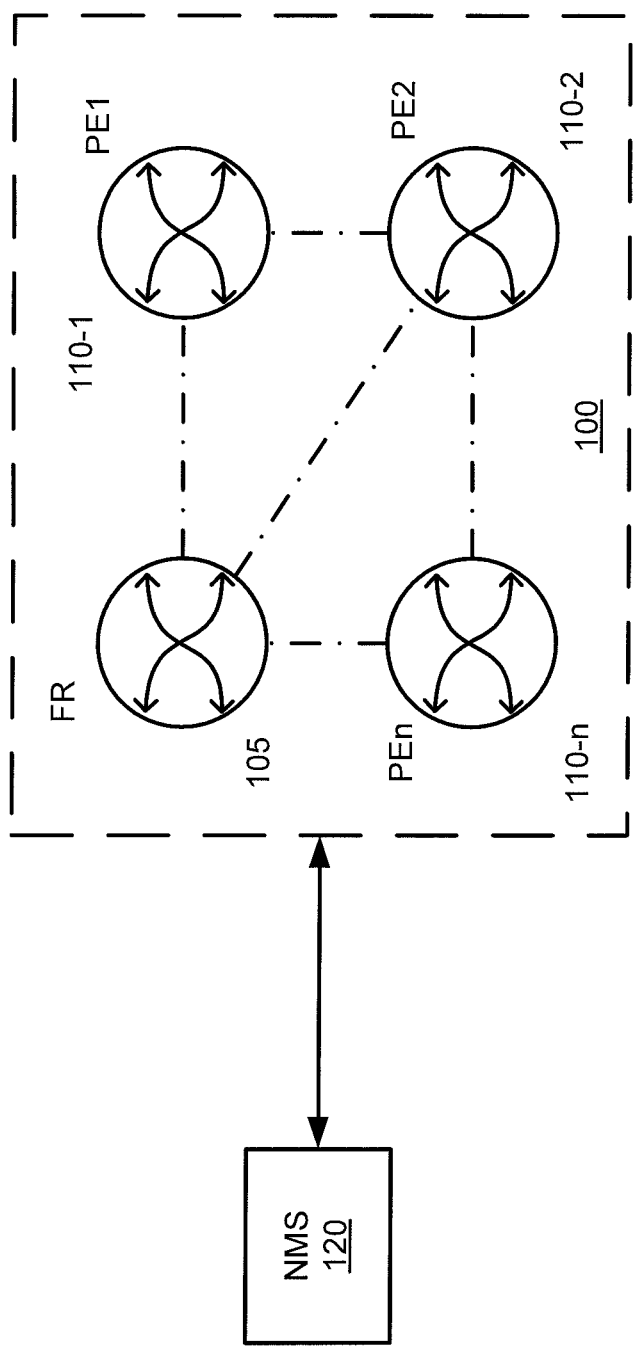
FIG. 1 depicts a high-level block diagram of a network benefiting from various embodiments.

The term FEC is broadly construed herein to describe a set of packets with similar and/or identical characteristics which may be forwarded the same way, such as by being bound to the same MPLS label. Characteristics determining the FEC of a higher-layer packet depend on the configuration of the LSR/PE, typically including at least the destination IP address. Quality of Service (QoS), customer, service type, traffic type and the like may also be used as characteristics for FEC purposes FIG. 1 depicts a high-level block diagram of a network benefiting from various embodiments. Specifically, the network 100 comprises a Forwarding Equivalence Class (FEC) Reflector (FR) 105 in communication with each of a plurality of provider edge (PE) routers 110-1 through 110-n (collectively PE routers 110). The FR node 105 is responsible for reflecting FEC information to/from the various PE routers 110. In various embodiments the FR node 105 acts as a PE router, while in other embodiments the FR node 105 does not act as a PE router. The network 100 is also associated with a network management system (NMS) 120.

Each of the PE routers 110 is depicted as implementing the same (i.e., a common) Virtual Private LAN Service (VPLS) instance supporting a large number of T-LDP sessions. It is noted that all of the PE routers 110 are depicted as being interconnected with each other in a full mesh topology. However, such full mesh interconnection is not necessary within the context of the various embodiments.

In various embodiments, the FR 105 comprises a network routing component providing an alternative to the logical full-mesh requirement of the T-LDP sessions. The FR 105 acts as a focal point for the T-LDP sessions such that multiple provider edge (PE) routers 110 supporting the T-LDP sessions can peer with or concentrate at a central point rather than peer with every other router in a full mesh. The FR 105 operates as a FEC route-reflector server at that central point, while other PE routers act as FEC route-reflector clients.

Various mechanisms for establishing a Forwarding Equivalence Class (FEC) Reflector (FR) functionality, such as for one or more Virtual Private LAN Service (VPLS) instances supporting a large number of T-LDP sessions will be now be described.

The various routing, switching, control and other functions are not specifically identified within the context of FIG. 1. Generally speaking, the FR 105 and PE routers 110 implement the various functions associated with Label Switched Routers within the context of an MPLS system. The various packet processing and/or control methodologies described herein are implemented by computing devices in or associated with the FR 105 and/or PE routers 110, such as described below with respect to FIG. 4.

The NMS 120 is a network management system adapted for performing the various management functions described herein. The NMS 120 is adapted to communicate with nodes 105 and 110 of the network. The NMS 120 may also be adapted to communicate with other operations support systems (e.g., Element Management Systems (EMSs), Topology Management Systems (TMSs), and the like, as well as various combinations thereof).

The NMS 120 may be implemented at a network node, network operations center (NOC) or any other location capable of communication with the CN 105 and various elements related thereto. The NMS 120 may support user interface capabilities to enable one or more users to perform various network management, configuration, provisioning or control related functions (e.g., enter information, review information, initiate execution of various methods as described herein and the like). Various embodiments of the NMS 120 are adapted to perform functions as discussed herein. The NMS 120 may be implemented as a general purpose computing device or specific purpose computing device, such as described below with respect to FIG. 4.

Figure 2:
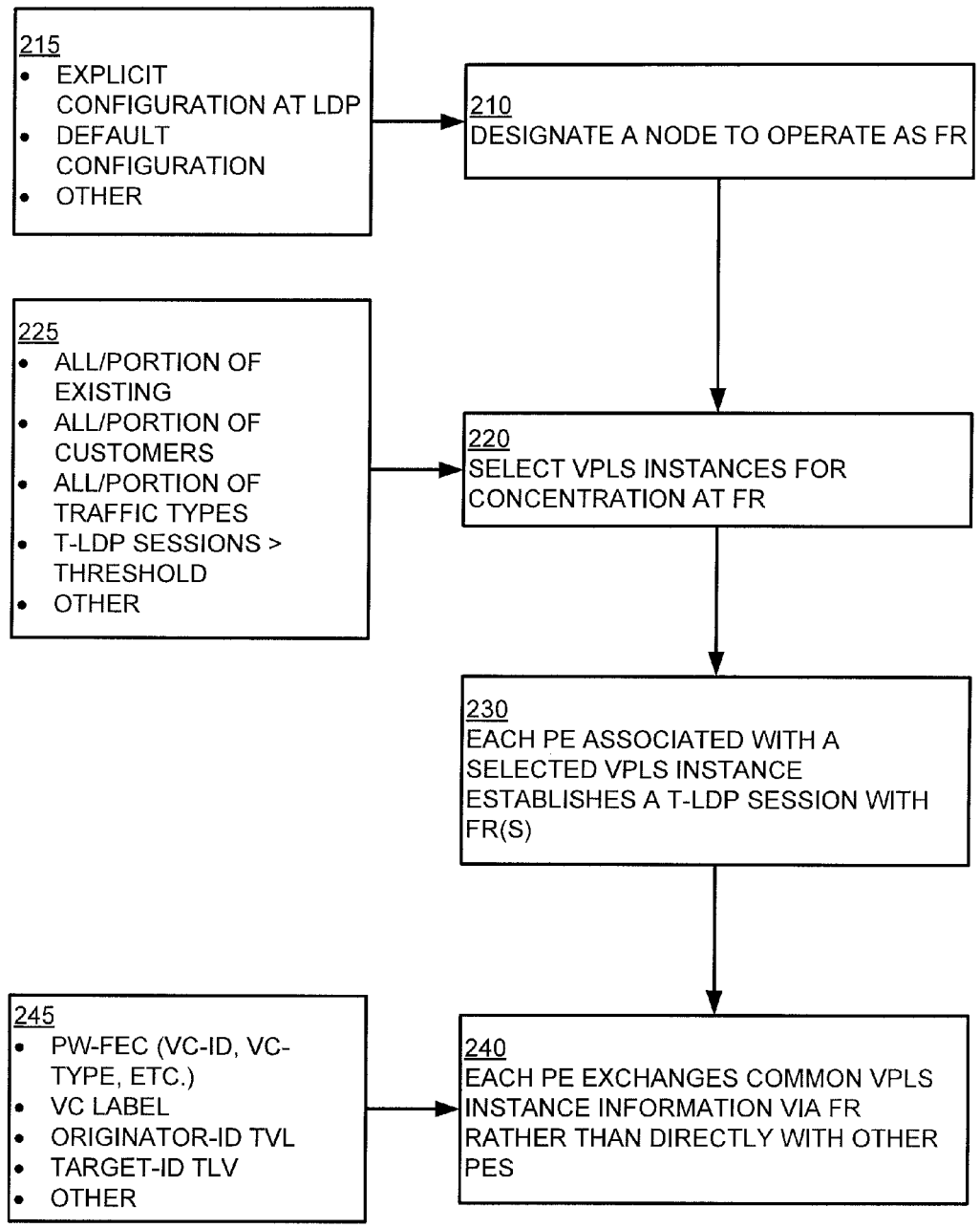
FIGS. 2-3 depict flow diagrams of methods according to various embodiments.

FIG. 2 depicts a flow diagram of a method according to one embodiment. Specifically, the method 200 of FIG. 2 is adapted to establish a Forwarding Equivalence Class (FEC) Reflector (FR) functionality for one or more Virtual Private LAN Service (VPLS) instances supporting a large number of T-LDP sessions.

At step 210, an available node or network element (e.g., one of a plurality of provider edge (PE) routers) is designated to operate as a Forwarding Equivalence Class (FEC) Reflector (FR). For example, referring to FIG. 1, the FR 105 may comprise a node or network element similar to the PE routers 110 or some other node or network element. Referring to box 215, a node may be designated as an FR node via explicit configuration such as at the LDP level, via a default configuration (e.g., a preferred node, a default node, a node matching a lowest link cost criteria and the like), or via some other means.

At step 220, one or more VPLS instances are selected for concentration at the designated FR(s). Referring to box 225, the selected VPLS instances may comprise all or a portion of existing VPLS instances or PEs 110, all or a portion of existing VPLS instances associated with specific customers or traffic types, all or a portion of those VPLS instances having a number of T-LDP sessions above a threshold level. Other criteria may also be used to select some or all of the VPLS sessions associated with one or more of the PE routers 110. Further, the various criteria may be combined in any manner.

At step 230, each PE associated with a selected VPLS instance establishes a T-LDP session with the FR.

At step 240, each of the PEs or nodes having established a T-LDP session with the FR(s) exchanges common VPLS instance information via the FR(s) rather than directly with the other PEs or nodes common to that VPLS instance. Referring to box 245, each PE needs to exchange the PW-FEC (VC-ID, VC-Type etc.) and respective VC Label with every other PE for its common VPN context. As will be described in more detail below, various embodiments contemplate that one or both (or neither) of two newly defined type-length-value (TLV) elements denoted herein as "Originator-ID TVL" and a "Target-ID TLV" may also be used.

Within the context of the various embodiments, each PE node still retains a full mesh of pseudo wires to all of the other PE nodes of a common VPLS instance (e.g., such as defined in the LDP-VPLS Standard). However, according to the various embodiments each PE or node now uses its respective T-LDP session to exchange information such as FEC/VC-Label Information and the like with the other PE nodes of the common VPLS instance.

Signaling/Processing at Ingress PE Node

Generally speaking, the various VPLS-related embodiments contemplate that FEC information is signaled in a LDP Label-Mapping Message to the FR Node rather than to a peer PE Node.

Various embodiments further contemplates that Originator PE and Target PE Node information is carried using one or more optional TLVs, denoted herein as a "Originator-ID TVL" and a "Target-ID TLV", which are defined herein as follows:

Originator-ID TVL: Contains the System Address of an Originator PE Node. This address is used at a Target PE node to identify the end-point of the Pseudo-Wire from the Originator PE node terminating at the Target PE node.

Target-ID TLV: Contain System Address of a Target PE Nodes. This address is used at an FR Node to reflect the FEC/VC-Label information from an Originator PE node to the correct Target PE Node.

In various embodiments, the above-defined TLVs are populated into Label Mapping Messages only when FR configuration is present on the PE Node. Various embodiments using neither of the TLV's, both of these TLV's or only one of these TLV's are contemplated by the inventors.

Signaling/Processing at FR Node(s)

Figure 3:
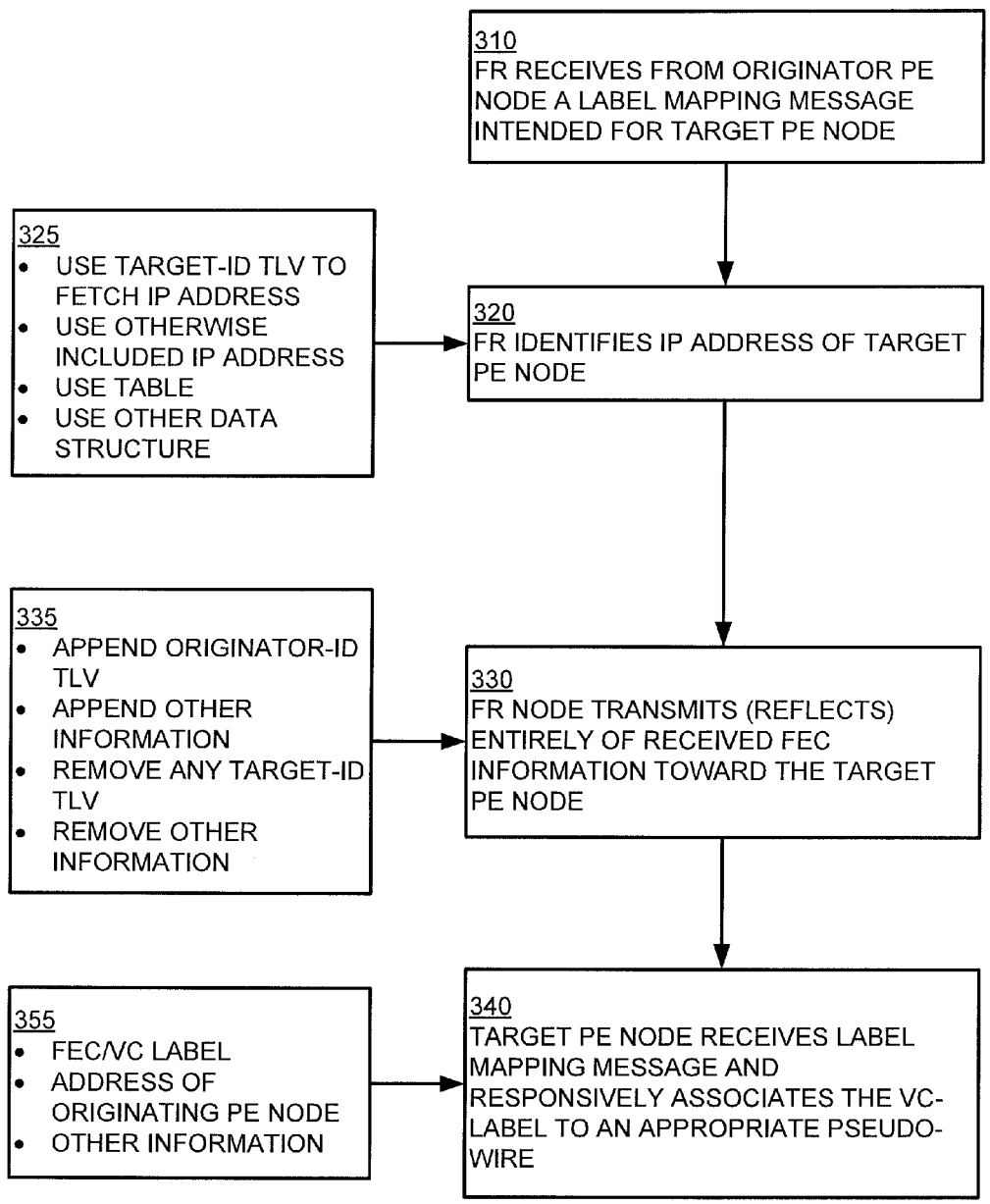

FIG. 3 depicts a flow diagram of a method of FR operation according to one embodiment.

At step 310, a FR receives a Label Mapping Message intended for a Target PE node. The Label Mapping Message typically includes a FEC TLV and a Label TLV to advertise to the LDP peers of the Originating PE node a binding of a FEC to a label.

At step 320, the FR identifies the IP addresses of the Target PE node. Referring to box 325, in an embodiment utilizing the Target-ID TLV, a FR Node receiving a Label Mapping Message with FEC TLV responsively searches for a Target-ID TLV to fetch thereby an IP address of a Target PE Node.

In an embodiment not utilizing the Originator-ID TLV, the Target PE node IP address should be included within the Label Mapping Message as part of an "IP destination" field or other data elements, depending upon the message formatting used. Various other embodiments utilize tables or other data structures directly indicative or indirectly indicative (i.e., suggestive) of IP addresses associated with actual or potential Target PE nodes. In these embodiments, message context and other information may be used to identify the IP address of the Target PE node.

At step 330, the FR node transmits (i.e., "reflects") the entirety of the received Label Mapping Message/FEC information toward the Target PE node. For example, the FEC TLV, Label TLV and (optionally) other message information is transmitted toward the Target PE node. The message information is generally reflected transparently (i.e., without any modification) to the Target PE Node. Referring to box 335, for embodiments utilizing the Originator-ID TLV, if the incoming Label Mapping Message does not contain Originator-ID TLV, then the FR Node appends an appropriate Originator-ID TLV to the Label Mapping Message prior to forwarding the Label Mapping Message to the Target PE. In addition, FR Node may leave or remove an existing Target-ID TLV when reflecting Label Mapping Message, since the Target-ID TLV is generally not used at the Target PE Node.

In an embodiment not utilizing the Originator-ID TLV, the Originator PE node IP address may be included within the Label Mapping Message as part of an "IP source" field or other data elements, depending upon the message formatting used.

Signaling/Processing at Egress PE Node

At step 340, the Target PE receives the Label Mapping Message reflected to it by the FR and responsively associates the VC-label to an appropriate pseudo-wire. Referring to box 345, upon receiving the Label Mapping Message from the FR, the Target PE is now in possession of the FEC/VC Label and the IP address of the Originator PE node (e.g., as "source address" data or via Originator-ID TLV). Based on all this information, Target PE can successfully associate the VC-Label of the FEC to the appropriate Pseudo-Wire between the Originator and Target PEs.

The above-described embodiments provide a number of advantages, including the following: (1) Every PE Node would now require a Single T-LDP Session to an FR Node, rather than full mesh of T-LDP sessions to all the other PE nodes; (2) Minimal Configuration Changes are required, since only a single line of additional configuration data at the Global LDP Level may be used to designate a particular node as an FR Node; (3) Since the FR Node is ignorant of FEC TLV/VC-Label information, no extra Label/FEC installation is required; and (4) No changes or extensions are required to the various L2VPN standards.

Figure 4:
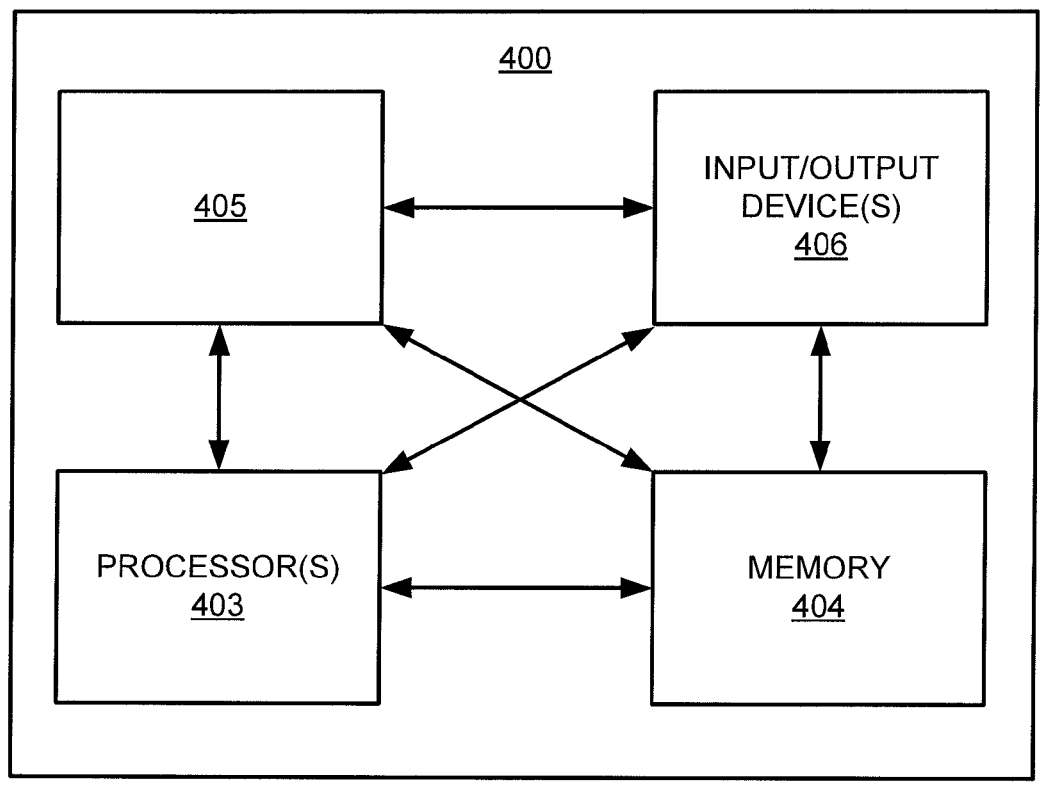
FIG. 4 depicts a high-level block diagram of a computer suitable for use in performing the functions described herein.

FIG. 4 depicts a high-level block diagram of a computer suitable for use in performing functions described herein. Specifically, the computer 400 described herein is well adapted for implementing the various functions described above with respect to the FR 105 and PE routers 110, as well as the methods/mechanisms described with respect to the various figures.

As depicted in FIG. 4, computer 400 includes a processor element 403 (e.g., a central processing unit (CPU) and/or other suitable processor(s)), a memory 404 (e.g., random access memory (RAM), read only memory (ROM), and the like), a cooperating module/process 405, and various input/output devices 406 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in software and/or in a combination of software and hardware, e.g., using a general purpose computer, one or more application specific integrated circuits (ASIC), and/or any other hardware equivalents. In one embodiment, the cooperating process 405 can be loaded into memory 404 and executed by processor 403 to implement the functions as discussed herein. Thus, cooperating process 405 (including associated data structures) can be stored on a computer readable storage medium, e.g., RAM memory, magnetic or optical drive or diskette, and the like.

It will be appreciated that computer 400 depicted in FIG. 4 provides a general architecture and functionality suitable for implementing functional elements described herein or portions of the functional elements described herein.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible and non-transitory computer readable medium such as fixed or removable media or memory, transmitted via a tangible or intangible data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method for reflecting Virtual Private LAN Service (VPLS) information between provider equipment (PE) nodes in a network, comprising:
   designating a node to operate as a Forwarding Equivalence Class (FEC) Reflector (FR) node;
   selecting one or more VPLS instances for concentration at said FR node;
   establishing a targeted label distribution protocol (T-LDP) session between said FR node and each of said PE nodes associated with said selected one or more VPLS instances to provide a pseudo-wire mesh between the PE nodes via said FR; and
   providing an exchange of common VPLS information by the FR node between any two nodes of the PE nodes through said FR node using the corresponding established T-LDP sessions.

2. The method of claim 1, wherein said FR node comprises a PE node.

3. The method of claim 1, wherein said designating is performed via an explicit configuration at a label distribution protocol (LDP) LDP.

4. The method of claim 1, wherein:
   said selecting comprises selecting a plurality of VPLS instances; and
   said establishing comprises establishing a T-LDP session between said FR node and PE nodes associated with any of said plurality of VPLS instances.

5. The method of claim 4, wherein said selected plurality of VPLS instances comprise all or a portion of existing VPLS instances.

6. The method of claim 4, wherein said selected plurality of VPLS instances comprise VPLS instances associated with all or a portion of customers associated with existing VPLS instances.

7. The method of claim 4, wherein said selected VPLS instances comprise VPLS instances associated with all or a portion of traffic types.

8. The method of claim 4, wherein said selected VPLS instances comprise VPLS instances associated a number of T-LDP sessions exceeding a threshold number.

9. The method of claim 1, wherein messages sent to said FR include one or both of an Originator PE Node address and a Target PE Node address.

10. The method of claim 9, wherein said Originator PE Node address is included within an Originator-identifier (ID) time-length-value (TVL).

11. The method of claim 9, wherein said Target PE Node address is included within an Originator-identifier (ID) time-length-value (TVL).

12. The method of claim 1, wherein said FR node is adapted to identify a Target PE node associated with a received Label Mapping Message and transmit message information of said Label Mapping Message toward the identified Target PE node.

13. The method of claim 12, wherein said FR node is adapted to identify said Target PE node using a Target-identifier (ID) time-length-value (TVL) included within said received Label Mapping Message.

14. The method of claim 12, wherein said FR node is adapted to append an Originator PE Node address to said message information transmitted towards said Target PE node.

15. The method of claim 14, wherein said Originator PE Node address is included within an Originator-identifier (ID) time-length-value (TVL).

16. The method of claim 13, wherein said FR node is adapted to remove said Target-ID TLV before said message information is transmitted towards said Target PE node.

17. The method of claim 12, wherein the message information transmitted toward the Target PE node comprises a Label Mapping Message including Forwarding Equivalence Class/Virtual Container (FEC/VC) Label information and Originator Node address, and adapted to enable the Target PE to associate a VC-Label to an appropriate Pseudo-wire.

18. An apparatus for reflecting Virtual Private LAN Service (VPLS) information between provider equipment (PE) nodes in a network, the apparatus comprising:
a processor configured for:
designating the apparatus as a node to operate as a Forwarding Equivalence Class (FEC) Reflector (FR) node;
selecting one or more VPLS instances for concentration at said FR node;
establishing a targeted label distribution protocol (T-LDP) session between said FR node and each of said PE nodes associated with said selected one or more VPLS instances to provide a pseudo-wire mesh between the PE nodes via said FR; and
providing an exchange of common VPLS information by the FR node between any two nodes of the PE nodes through said FR node using the corresponding established T-LDP sessions.

19. A non-transitory computer readable storage medium storing instructions which, when executed by a computer, cause the computer to perform a method for reflecting Virtual Private LAN Service (VPLS) information between provider equipment (PE) nodes in a network, the method comprising:
designating a node to operate as a Forwarding Equivalence Class (FEC) Reflector (FR) node;
selecting one or more VPLS instances for concentration at said FR node;
establishing a targeted label distribution protocol (T-LDP) session between said FR node and each of said PE nodes associated with said selected one or more VPLS instances to provide a pseudo-wire mesh between the PE nodes via said FR; and
providing an exchange of common VPLS information by the FR node between any two nodes of the PE nodes through said FR node using the corresponding established T-LDP sessions.

20. A non-transitory computer program product wherein computer instructions stored in a computer readable memory, when processed by a computer, adapt the operation of the computer to provide a method for reflecting Virtual Private LAN Service (VPLS) information between provider equipment (PE) nodes in a network, the method comprising:
designating a node to operate as a Forwarding Equivalence Class (FEC) Reflector (FR) node;
selecting one or more VPLS instances VPLS instance for concentration at said FR node;
establishing a targeted label distribution protocol (T-LDP) session between said FR node and each of said PE nodes associated with said selected one or more VPLS instances to provide a pseudo-wire mesh between the PE nodes via said FR; and
providing an exchange of common VPLS information by the FR node between any two nodes of the PE nodes through said FR node using the corresponding established T-LDP sessions.

* * * * *